(12) United States Patent
Yoshikawa et al.

(10) Patent No.: US 8,306,206 B2
(45) Date of Patent: Nov. 6, 2012

(54) CALLBACK SYSTEM, TRANSMITTING TERMINAL, TELEPHONE RELAY SERVER, CALLBACK METHOD AND CALLBACK PROGRAM

(75) Inventors: Masato Yoshikawa, Tokyo (JP); Akihisa Kurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 265 days.

(21) Appl. No.: 12/920,099

(22) PCT Filed: Feb. 16, 2009

(86) PCT No.: PCT/JP2009/052474
§ 371 (c)(1),
(2), (4) Date: Aug. 27, 2010

(87) PCT Pub. No.: WO2009/107494
PCT Pub. Date: Sep. 3, 2009

(65) Prior Publication Data
US 2011/0007888 A1 Jan. 13, 2011

(30) Foreign Application Priority Data
Feb. 29, 2008 (JP) .................................. 2008-050722

(51) Int. Cl.
*H04M 3/42* (2006.01)
*H04M 15/00* (2006.01)

(52) U.S. Cl. .................................. 379/210.01; 379/111

(58) Field of Classification Search ............. 379/210.01, 379/201.01, 111, 112.06, 114.05
See application file for complete search history.

(56) References Cited

U.S. PATENT DOCUMENTS
2005/0002515 A1 * 1/2005 Mewhinney et al. .... 379/266.08

FOREIGN PATENT DOCUMENTS
| JP | 2002-209239 (A) | 7/2002 |
| JP | 2004-96249 (A) | 3/2004 |
| JP | 2007-274044 (A) | 10/2007 |
| JP | 2007-324732 (A) | 12/2007 |

* cited by examiner

*Primary Examiner* — Thjuan K Addy
(74) *Attorney, Agent, or Firm* — Foley & Lardner LLP

(57) ABSTRACT

The callback system comprises: a transmitting terminal which comprises a storing section configured to store an attribute data which is uniquely determined and given, and a transmission request processing section configured to transmit a callback request including the attribute data for starting a callback communication; a database configured to relate and store a callback transmission source telephone number used in the callback communication for each attribute group prepared by collecting a plurality of the attribute data; a charging target judging section configured to receive the callback request and extract the callback transmission source telephone number which corresponding to the attribute data included in the callback request, as a selection callback transmission source telephone number from the database; and a transmission processing section configured to carry out the callback communication with the transmitting terminal, with the selection callback transmission source telephone number as a transmission source telephone number.

15 Claims, 5 Drawing Sheets

Fig. 2A

| USER ID | TRANSMISSION NUMBER |
|---|---|
| 0001 | 03-XXXX-XXX1 |
| 0002 | |
| 0003 | 03-XXXX-XXX2 |
| 0004 | 03-XXXX-XXX3 |
| 0005 | |
| 0006 | |

Fig. 2B

| REQUEST SOURCE TELEPHONE NUMBER | TRANSMISSION NUMBER |
|---|---|
| 03-XXXX-XXX1 | 03-XXXX-XXX1 |
| 03-XXXX-XXX2 | |
| 03-XXXX-XXX3 | 03-XXXX-XXX2 |
| 03-XXXX-XXX4 | 03-XXXX-XXX3 |
| 03-XXXX-XXX5 | |
| 03-XXXX-XXX6 | |

Fig. 2C

| USER AGENT | TRANSMISSION NUMBER |
|---|---|
| Doxxmo2.ON904i (c100.TJ.ser53432) | 03-XXXX-XXX1 |
| Doxxmo2.ON703iD (c100.TJ.ser93832) | |
| Doxxmo2.ON903i (c100.TJ.ser93733) | 03-XXXX-XXX2 |
| Doxxmo2.ON704imyu (c100.TJ.ser15374) | 03-XXXX-XXX3 |
| Doxxmo2.ON905i (c100.TJ.ser28347) | |
| Doxxmo2.ON905imyu (c100.TJ.ser72632) | |

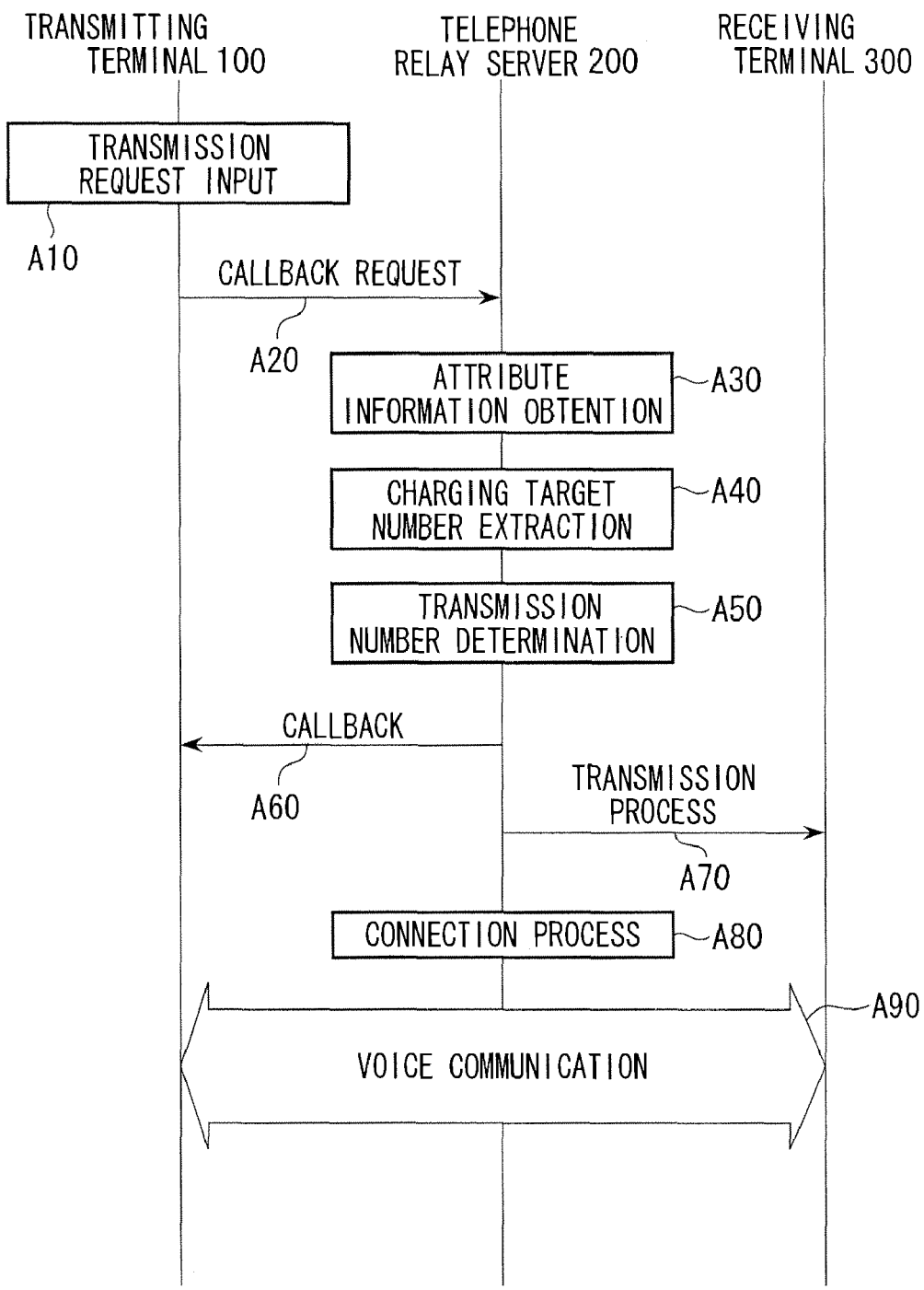

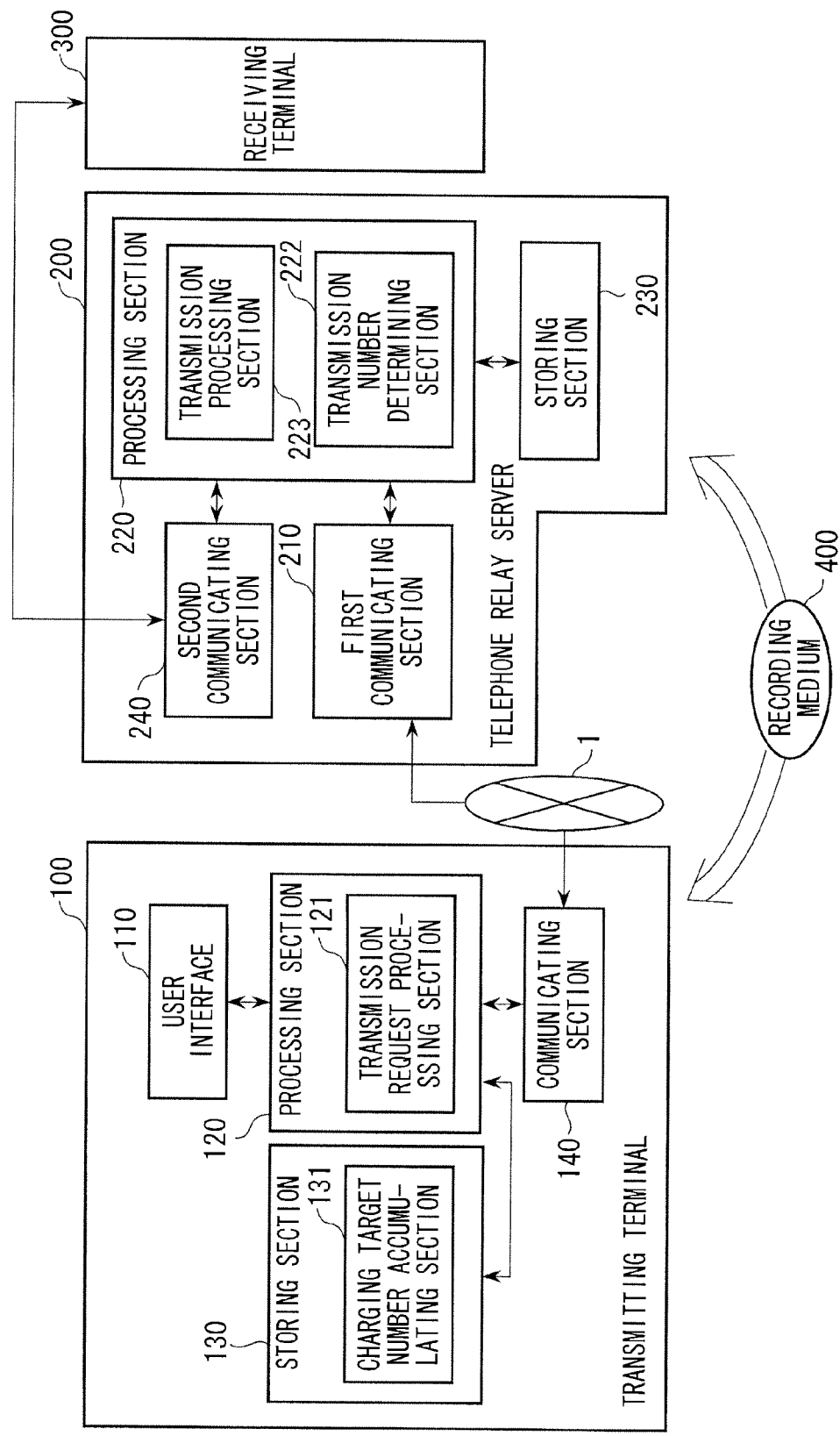

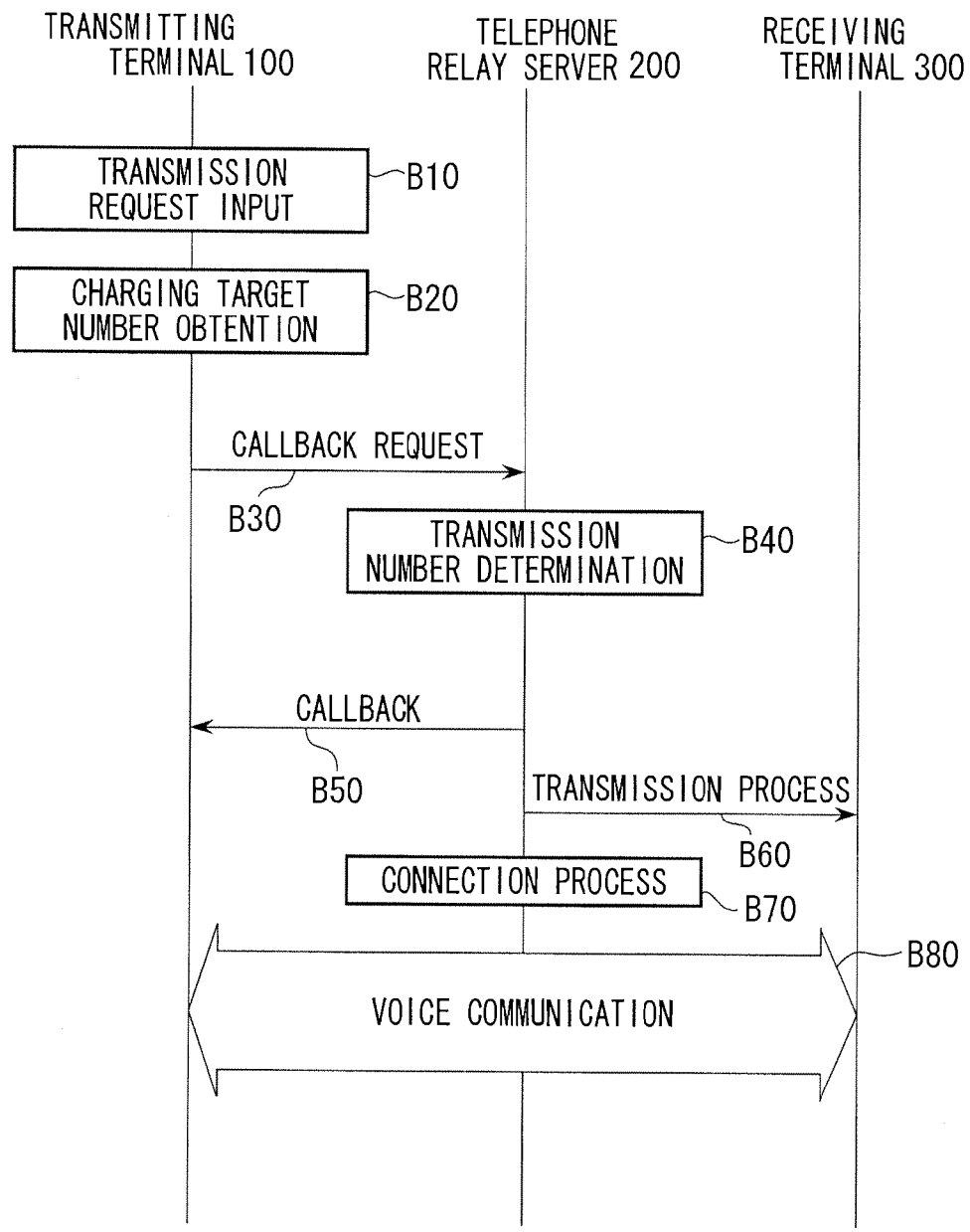

CALLBACK SYSTEM, TRANSMITTING TERMINAL, TELEPHONE RELAY SERVER, CALLBACK METHOD AND CALLBACK PROGRAM

This application is the National Phase of International Patent Application No. PCT/JP2009/052474, filed Feb. 16, 2009, which claims priority from Japanese Patent Application No. 2008-050722, filed Feb. 29, 2008. The contents of these applications are incorporated herein by reference in their entirety.

TECHNICAL FIELD

The present invention relates to a callback system.

BACKGROUND ART

A callback system is a system in which a reply transmission (callback) is carried out from a callback server installed inside a company and the like, to a transmitting terminal that requests a transmission. In the callback system, since the callback is carried out, a telephone conversation charging target is used as the callback server so that a usage fee can be paid by the company side. In recent years, a portable telephone is widely popular, and there are many cases in which personal terminals are used for businesses. The callback system is widely introduced in a case that for the transmission through the personal terminal as mentioned above, the usage fee is paid by the company side or in the other cases.

Typically, in the callback system, the transmitting terminal firstly transmits an electronic request, which includes the telephone number of the transmitting terminal and the like, to the callback server inside the company. Next, the callback server receiving the request carries out a re-transmission (callback) to the telephone number of the transmitting terminal. The callback system attains the callback through such an operation. Also, since the transmitting terminal puts the telephone number of a receiving terminal, which is scheduled to carry out a reception, into the request to be transmitted, the telephone conversation can be attained between the transmitting terminal and the receiving terminal through the callback system. In this case, at first, the callback server completes the callback to the receiving terminal. Next, the callback server carries out the transmission to the telephone number of the receiving terminal and completes the telephone conversation connection to the receiving terminal. After that, the callback server connects the telephone conversation between the transmitting terminal and the receiving terminal and attains the communication between both of the terminals. The foregoing system is disclosed as the conventional technique.

Japanese Patent Publication JP2007-274044A discloses a callback system for easily avoiding that the telephone conversation fee used in the field of a business is paid by a person. The callback system in Japanese Patent Publication JP2007-274044A has a gateway, which is connected to a messenger server and an input terminal, in the callback system that is provided with the messenger server for proving a messenger service and the input terminal for inputting an instant message. The gateway is characterized by connecting a telephone of a transmission source telephone number that is included in the instant message inputted by the input terminal and a telephone of a telephone number of a transmission destination. According to Japanese Patent Publication JP2007-274044A, the gateway that is connected to the messenger server for providing the messenger service and the input terminal for inputting the instant message is designed to connect the telephone of the transmission source telephone number that is included in the instant message inputted by the input terminal and the telephone of the transmission destination telephone number. Thus, it is possible to easily avoid that the telephone conversation fee used in the field of the business is paid by the person.

However, the conventional callback system does not pay attention to the telephone number of the transmission source. Thus, the usage fee is charged at a telephone number unit assigned to the callback server serving as the transmission source. For this reason, the company in which the callback system is installed has a severe difficulty when the telephone conversation fee is sorted for each department for example. This is because, when the usage fee is sorted for each department, the company side is required to carry out a work for correlating the telephone number of the callback destination and the transmitting terminal (or the department to which the transmitting terminal belongs), in accordance with the telephone conversation history of a telephone conversation specification and the like.

DISCLOSURE OF INVENTION

An object of the present invention is to provide a callback system that can easily sort a usage fee.

The callback system of the present invention contains: a transmitting terminal that contains a storing section for storing an attribute data which is uniquely determined and given and a transmission request processing section for transmitting a callback request in which the attribute data is included to start a callback communication; a database that relates and stores callback transmission source telephone numbers used in the callback communication, for each attribute group prepared by collecting a plurality of attribute data; a charging target judging section that receives the callback request and extracts the callback transmission source telephone number corresponding to the attribute data included in the callback request, as a selection callback transmission source telephone number from the database; and a transmission processing section that carries out the callback communication with the transmitting terminal, with the selection callback transmission source telephone number as the transmission source telephone number.

The transmitting terminal of the present invention contains: the storing section for storing the attribute data that is uniquely determined and given; and the transmission request processing section for transmitting the callback request in which the attribute data is included to start the communication through the callback.

The telephone relay server of the present invention contains: the database that relates and stores the callback transmission source telephone number used in the callback communication, for each attribute group prepared by collecting the plurality of attribute data, wherein the attribute data is uniquely determined and given to the transmitting terminal for transmitting the callback request in which the attribute data is included to start the callback communication; the charging target judging section for receiving the callback request and extracting the callback transmission source telephone number corresponding to the attribute data included in the callback request, as the selection callback transmission source telephone number from the database; and the transmission processing section that carries out the callback communication with the transmitting terminal, with the selection callback transmission source telephone number as the transmission source telephone number.

The callback method of the present invention contains: a step of storing the attribute data that is uniquely determined and given; a step of transmitting the callback request in which the attribute data is included to start the callback communication; a step of correlating and storing the callback transmission source telephone number used in the callback communication, for each attribute group prepared by collecting the plurality of attribute data; a step of receiving the callback request; a step of extracting the callback transmission source telephone number corresponding to the attribute data included in the callback request, as the selection callback transmission source telephone number from the database; and a step of carrying out the callback communication with the transmitting terminal transmitting the callback request, with the selection callback transmission source telephone number as the transmission source telephone number.

A recording medium for storing a program to be executed by a computer of the present invention contains: the step of storing the attribute data that is uniquely determined and given; the step of transmitting the callback request in which the attribute data is included to start the callback communication; the step of correlating and storing the callback transmission source telephone number used in the callback communication, for each attribute group prepared by collecting the plurality of attribute data; the step of receiving the callback request; the step of extracting the callback transmission source telephone number corresponding to the attribute data included in the received callback request, as the selection callback transmission source telephone number from the database; and the step of carrying out the callback communication with the transmitting terminal transmitting the callback request, with the selection callback transmission source telephone number as the transmission source telephone number.

According to the present invention, it is possible to provide the callback system that can easily sort the usage fee.

BRIEF DESCRIPTION OF DRAWINGS

The objects, effects and features of the present invention as mentioned above are further evident from the descriptions of the exemplary embodiments in linkage to the attached drawings.

FIG. 2A is a view showing a database of a charging management information accumulating section 231, when a user ID is used as an attribute data, in the first exemplary embodiment.

FIG. 2B is a view showing the database of the charging management information accumulating section 231, when a telephone number of a transmitting terminal 100 is used as the attribute data, in the first exemplary embodiment.

FIG. 2C is a view showing the database of the charging management information accumulating section 231, when an HTTP user agent is used as the attribute data, in the first exemplary embodiment.

FIG. 3 is an operational flow of the callback system, in the first exemplary embodiment.

FIG. 4 is a view showing a configuration of a callback system, in a second exemplary embodiment.

FIG. 5 is an operational flow of the callback system, in the second exemplary embodiment.

DESCRIPTION OF EMBODIMENTS

Figure 1:
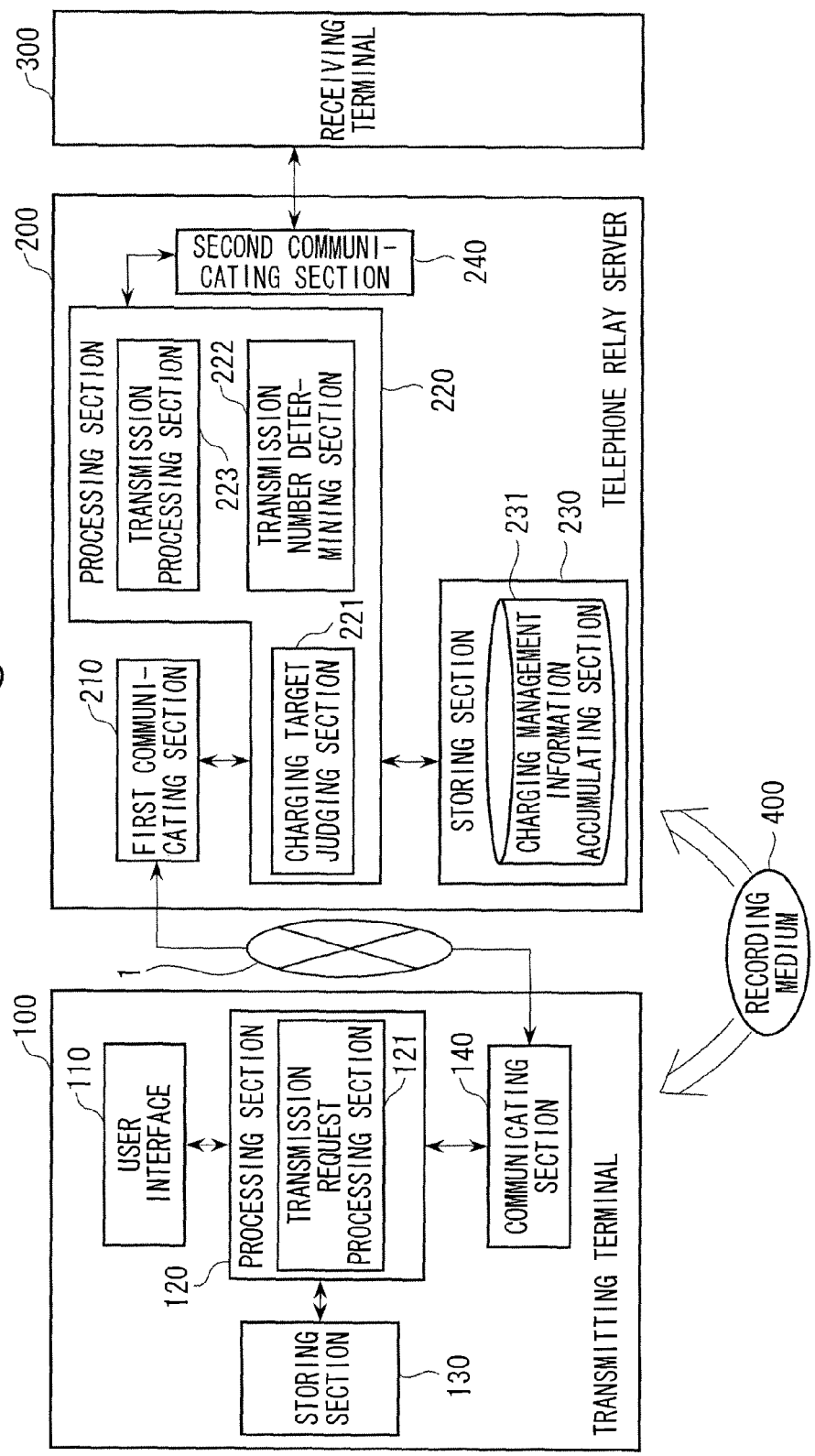
FIG. 1 is a view showing a configuration of a callback system, in a first exemplary embodiment.

The callback system of the present invention will be described below with reference to the attached drawings.

(First Exemplary Embodiment)

At first, the first exemplary embodiment is described.

(Description of Configuration)

At first, the configuration of the callback system in this exemplary embodiment is described. FIG. 1 is the view showing the configuration of the callback system in this exemplary embodiment. The callback system in this exemplary embodiment contains a communication network 1, the transmitting terminal 100, a telephone relay server 200 and a receiving terminal 300.

At first, the communication network 1 is described. The communication network 1 is the network to connect a communication between the transmitting terminal 100 and the telephone relay server 200. The communication network 1 may be a fixed communication network or a mobile communication network. The communication network 1 may be a switching network composed of a plurality of switchers, or may be an exclusive line network composed of a plurality of transmitters, or may be an IP (Internet Protocol) network composed of a plurality of routers, or may be a network in which the foregoing networks are combined. In this exemplary embodiment, the communication network 1 is not especially limited if this can connect the communication between the transmitting terminal 100 and the telephone relay server 200, by using the conventional technique. By the way, since the communication method used in the communication network 1 and the like are based on the conventional technique, their detailed descriptions are omitted. The communication network 1 is managed by a communication carrier. The communication carrier charges the voice communication executed in the communication network 1. The communication carrier uses the transmission source telephone number of the voice communication in the communication network 1, as the charging target. The communication carrier charges the usage fee of the voice communication in the communication network 1 at a transmission source telephone number unit.

The transmitting terminal 100 will be described below. The transmitting terminal 100 is the communication terminal housed in the communication network 1. The transmitting terminal 100 may be the fixed communication terminal or the mobile communication terminal. The terminal type of the transmitting terminal 100 is based on the communication network 1. If the transmitting terminal 100 can be connected to the communication network 1 to carry out the communication, its terminal type is not limited. In short, the transmitting terminal 100 widely includes the computer terminal having the communication function, such as an IP telephone terminal, a portable telephone terminal, a personal computer, or PDA (Personal Digital Assistant) or the like. By the way, in this exemplary embodiment, the transmitting terminal 100 is described by using only one transmitting terminal 100 in order to simplify the description. However, naturally, there may be a plurality of transmitting terminals 100. The transmitting terminal 100 can be connected to the communication network 1 to communicate with the telephone relay server 200. The transmitting terminal 100 transmits the callback request through the communication network 1 to the telephone relay server 200. Also, the transmitting terminal 100 receives the callback through the communication network 1 from the telephone relay server 200. Moreover, the transmitting terminal 100 carries out the voice communication with the receiving terminal 300 through the telephone relay server 200. The configuration of the transmitting terminal 100 will be described below in detail.

The transmitting terminal 100 contains a user interface 110, a processing section 120, a storing section 130 and a communicating section 140.

At first, the user interface 110 is described. The user interface 110 is the interface to the user who uses the transmitting terminal 100. The user interface 110 is provided with: an input unit composed of a keyboard, a mouth, a keypad or a touchpad or the like; a display composed of LCD (Liquid Crystal Display) and the like; and a voice input/output unit composed of a microphone and a speaker (all of them are not shown). Since the user interface 110 is configured with the conventional technique, its detailed description is omitted. The user of the transmitting terminal 100 uses the keypad of the user interface 110 or the like and inputs the transmission request when the telephone conversation is started. Also, the user of the transmitting terminal 100 carries out the voice telephone conversation by using the speaker, the microphone or the like in the user interface 110 when the voice communication is started.

The processing section 120 will be described below. The processing section 120 executes the functions of the transmitting terminal 100. The processing section 120 is provided with CPU (Central Processing Unit) and the like. The processing section 120 attains the functions of the transmitting terminal 100, by reading and executing a processing program stored in the storing section 130. The functions of the transmitting terminal 100 are a data communication function, a voice communication function and the like that are carried out by using the communication network 1, in addition to the following functions. Also, the processing section 120 contains a transmission request processing section 121.

The transmission request processing section 121 transmits the callback request through the communicating section 140 to the telephone relay server 200, in accordance with the transmission request inputted to the user interface 110. The transmission request processing section 121 transmits the callback request which is transmitted to the telephone relay server 200 and in which the attribute data of the transmitting terminal 100 is included. The transmission request processing section 121 obtains the attribute data stored in the storing section 130. Here, the attribute data is the information that is used to determine the callback transmission source telephone number when the telephone relay server 200 carries out the callback. The attribute data is a "User ID" and a "Telephone Number" of the transmitting terminal 100, which are uniquely determined for each transmitting terminal 100 and registered in advance in the transmitting terminal 100 by the user. Also, the attribute data may be an "HTTP (Hypertext Transfer Protocol) User Agent (HTTP_USER_AGENT) of Transmitting Terminal 100" when HTTP is used to carry out the data communication. By the way, if the attribute data can uniquely specify the transmitting terminal 100, this is not limited to those kinds.

The transmitting terminal 100 transmits the callback request in which the attribute data, the telephone number of the transmitting terminal 100 and the telephone number of the receiving terminal 300 are included. The transmitting terminal 100 transmits the callback request by using the data communication in which the HTTP is used on TCP/IP. Or, the transmitting terminal 100 may transmit the callback request by using a method that transmits it through an electronic mail or a method that transmits it which is included on a call control protocol of an IP telephone. In this exemplary embodiment, there is no special limitation in the transmission method of the callback request, as long as if the transmission can be done including the attribute data, since any transmission method, including the one of a conventional callback system, is widely applicable.

The storing section 130 will be described below. The storing section 130 is provided with ROM (Read Only Memory), RAM (Random Access Memory) and the like. The storing section 130 stores the processing program to attain the functions of the transmitting terminal 100. The foregoing processing program can be recorded in a recording medium 400 shown in FIG. 1. The recording medium 400 is, for example, a CD (Compact Disc). Since the processing program can be recorded in the recording medium 400, this becomes portable. In that case, since the recording medium 400 is used to introduce the processing program into a computer (or the processing program recorded in the recording medium 400 is introduced into the computer through a network that is not shown), the functions of the transmitting terminal 100 can be attained. Also, the storing section 130 stores the data used to attain the functions of the transmitting terminal 100. The data stored by the storing section 130 is, for example, a telephone directory data, a transmission reception history data and the like. Moreover, the storing section 130 stores the attribute data of the transmitting terminal 100, as mentioned above.

The communicating section 140 will be described below. The communicating section 140 communicates with the telephone relay server 200 through the communication network 1. The communicating section 140 can communicate with the telephone relay server 200 in accordance with the communication protocol used in the communication network 1. In this exemplary embodiment, there is no limitation in the communication method executed by the communicating section 140, as long as it is possible to carry out the communication by connecting to the communication network 1, as mentioned above. That is, the communication method executed by the communicating section 140 may be a wired communication or a wireless communication. The communicating section 140, when carrying out the wireless communication, contains the configuration required for the wireless communication, such as a wireless communication antenna, a wireless transmitting/receiving unit and the like. In this exemplary embodiment, since the communicating section 140 carries out the communication in accordance with the conventional technique, its detailed description is omitted. The communicating section 140 transmits the callback request from the transmission request processing section 121, through the communication network 1 to the telephone relay server 200. Also, the communicating section 140 transmits and receives the data in the voice communication to and from the telephone relay server 200 through the communication network 1.

The receiving terminal 300 will be described below. The receiving terminal 300 is an opposite communication terminal with which the transmitting terminal 100 carries out the voice communication through the telephone relay server 200. The receiving terminal 300 can communicate with the telephone relay server 200. In this exemplary embodiment, if the receiving terminal 300 can communicate with the telephone relay server 200, its terminal type and communication method are not limited. In short, the receiving terminal 300 can connect the communication with the telephone relay server 200 through an extension network inside a company, a network such as the communication network 1 or the like. Also, the receiving terminal 300 widely includes the computer terminal having the communication function, such as the IP telephone terminal, the portable telephone, the personal computer, or PDA (Personal Digital Assistant) or the like. By the way, in this exemplary embodiment, the receiving terminal 300 is described by using only one receiving terminal 300, in order to simplify the description. However, there may be a plurality of receiving terminals 300. Moreover, the receiving terminal 300 may be one of the plurality of existing transmitting terminals 100. In this exemplary embodiment, the receiving terminal 300 is designed on the basis of the conventional technique and carries out the communication with the telephone relay server 200 in accordance with the conventional technique. Thus, its detailed description is omitted.

The telephone relay server 200 will be described below. The telephone relay server 200 is placed in a server room inside a company, a network center of ASP (Application Service Provider) and the like. The telephone relay server 200 receives the callback request from the transmitting terminal 100 and carries out the callback to the transmitting terminal 100. Also, when the callback to the transmitting terminal 100 is connected, the telephone relay server 200 carries out the transmission addressed to the telephone number of the receiving terminal 300 that is included in the telephone relay server 200. When the transmission to the receiving terminal 300 is connected, the telephone relay server 200 connects the voice communication between the transmitting terminal 100 and the receiving terminal 300. In this way, the telephone relay server 200 attains the voice communication between the transmitting terminal 100 and the receiving terminal 300, in accordance with the callback request from the transmitting terminal 100. The configuration of the telephone relay server 200 will be described below in detail.

The telephone relay server 200 contains a first communicating section 210, a processing section 220, a storing section 230 and a second communicating section 240.

At first, the first communicating section 210 is described. The first communicating section 210 communicates with the communicating section 140 in the transmitting terminal 100 through the communication network 1. The first communicating section 210 can communicate with the communicating section 140 in accordance with the communication protocol used in the communication network 1. In this exemplary embodiment, since the first communicating section 210 carries out the communication in accordance with the conventional technique, its detailed description is omitted. The first communicating section 210 receives the callback request transmitted by the communicating section 140. The first communicating section 210 outputs the received callback request to a charging target judging section 221. Also, the first communicating section 210 transmits and receives the data in the voice communication to and from the communicating section 140.

The second communicating section 240 will be described below. The second communicating section 240 communicates with the receiving terminal 300. The second communicating section 240, when communicating with the receiving terminal through a network such as the communication network 1, can carry out the communication in accordance with the communication method used in the network. In this exemplary embodiment, since the second communicating section 240 carries out the communication in accordance with the conventional technique, its detailed description is omitted.

The storing section 230 will be described below. The storing section 230 is provided with ROM, RAM and the like. The storing section 230 stores the processing program for attaining the functions of the telephone relay server 200. The foregoing processing program can be recorded in the recording medium 400, similarly to the processing program of the transmitting terminal 100. Then, since the recording medium 400 is used to introduce the processing program into the computer (or through a network that is not shown, the processing program recorded in the recording medium 400 is introduced into the computer), the functions of the telephone relay server 200 can be attained. Also, the storing section 230 stores the data required for the functions of the telephone relay server 200. The data required for the functions of the telephone relay server 200 are, a routing table in which the IP addresses of the transmitting terminal 100 and the receiving terminal 300 are recorded and the like, for example, when the telephone relay server 200 uses the IP network to carry out the communication. Also, the storing section 230 contains the charging management information accumulating section 231.

The charging management information accumulating section 231 stores a database in which the attribute data of the transmitting terminal 100 and the callback transmission source telephone number at the time of the callback request are related.

FIGS. 2A to 2C show examples of the database stored by the charging management information accumulating section 231.

At first, FIG. 2A is the view showing the database when "User ID" is used as the attribute data, in this exemplary embodiment. The database in FIG. 2A has a user ID column 400 and a transmission number column 401. In the user ID column 400, a user ID assigned to a transmitting terminal 100 is recorded. The transmission number column 401 records the transmission source telephone numbers (hereafter, referred to as the callback transmission source telephone numbers) in the callback transmission. The user ID is determined in advance uniquely for the transmitting terminal 100, by a contact person in a company (hereafter, referred to as an in-company contact person) in which the telephone relay server 200 is placed. The user of the transmitting terminal 100 registers the predetermined user ID in the transmitting terminal 100. Also, the in-company contact person classifies the user IDs into several groups. The in-company contact person determines while correlating the callback transmission source telephone number for each group of the user IDs. The in-company contact person registers the user ID and the corresponding callback transmission source telephone number for each group of the user IDs, in the database in the charging management information accumulating section 231. The telephone relay server 200, since carrying out the communication by also using the corresponding callback transmission source telephone number for each group of the user IDs in the callback, can sort the charging source for each callback transmission source telephone number.

With reference to FIG. 2A, for example, when the user ID included in the callback request from the transmitting terminal 100 is "0001" or "0002", the corresponding callback transmission source telephone number can be checked to be "03-xxxx-xxx1". This represents that, when the callback request from the transmitting terminal 100 whose user ID is "0001" or "0002" is received, the transmission is carried out with the callback transmission source telephone number in the callback transmission as "03-xxxx-xxx1". Similarly, when the user ID is "0003", "03-xxxx-xxx2" corresponds to the callback transmission source telephone number. Moreover, when the user ID is "0004 to 0006", "03-xxxx-xxx3" corresponds to the callback transmission source telephone number.

The user IDs registered in the database in FIG. 2A are classified into three groups in accordance with the callback transmission source telephone number. These three groups correspond to, for example, the respective departments in the company. In this way, the in-company contact person groups the user IDs for each department in the company, in which the usage fee is desired to be sorted, to relate to the callback transmission source telephone numbers, so as to register in the database of the charging management information accumulating section 231. The communication carrier in the communication network 1 charges the usage fee for each telephone number of the transmission source. Thus, the communication carrier carries out the charging for each callback transmission source telephone number corresponding to each of the grouped groups. Hence, the usage fee can be easily sorted for each department.

Next, FIG. 2B is the view showing the database when "Telephone Number of Transmitting Terminal 100" is used as the attribute data, in this exemplary embodiment. The database in FIG. 2B has a request source telephone number column 402 and a transmission number column 403. The request source telephone number column 402 records the telephone numbers of the transmitting terminals 100. The transmission number column 401 records the callback transmission source telephone numbers. For example, when the telephone number of the transmitting terminal 100 included in the callback request is "090-xxxx-xxx1" or "090-xxxx-xxx2", the corresponding callback transmission source telephone number can be checked to be "03-xxxx-xxx1". The other points are similar to the case when the attribute data is "User ID". In this way, the telephone relay server 200 can sort the charging source for each callback transmission source telephone number, by also using the corresponding callback transmission source telephone number for each group of the telephone numbers of the transmitting terminals 100 and carrying out the communication, in the callback.

Next, FIG. 2C is the view showing the database when "HTTP User Agent" is used as the attribute data, in this exemplary embodiment. The database in FIG. 2C has a user agent column 404 and a transmission number column 405. The user agent column 404 records the HTTP user agent which is, at the time of the HTTP communication, included in an HTTP header and transmitted by the transmitting terminal 100. The transmission number column 405 records the callback transmission source telephone numbers. Since the HTTP user agent that includes an identifier assigned for each terminal is related to the callback transmission source telephone number, the transmitting terminal 100 can be grouped. With reference to FIG. 2C, for example, when the HTTP user agent included in the callback request from the transmitting terminal 100 is "Doxxmo/2.0N904i(c100, TJ, ser53432)" or "Doxxmo/2.0N703iD(c100, TJ, ser93832)", the corresponding callback transmission source telephone number can be checked to be "03-xxxx-xxx1". The other points are similar to the case in which the attribute data is "User ID". In this way, the telephone relay server 200 can sort the charging source for each callback transmission source telephone number, by also using the corresponding callback transmission source telephone number for each group of the HTTP user agents and carrying out the communication, in the callback.

The processing section 220 will be described below. The processing section 220 executes the functions of the telephone relay server 200. The processing section 220 is provided with CPU and the like. The processing section 220 executes the functions of the telephone relay server 200 by reading and executing the processing program stored in the storing section 230.

The processing section 220 contains the charging target judging section 221, a transmission number determining section 222 and a transmission processing section 223.

At first, the charging target judging section 221 is described. The charging target judging section 221 extracts the callback transmission source telephone number corresponding to the attribute data of the transmitting terminal 100, from the database of the charging management information accumulating section 231. The charging target judging section 221 receives the callback request from the transmitting terminal 100, through the first communicating section 210. The charging target judging section 221 obtains the attribute data of the transmitting terminal 100 included in the callback request. The charging target judging section 221 uses the attribute data as the key for a retrieval and extracts the callback transmission source telephone number from the database of the charging management information accumulating section 231. For example, when the attribute data is the user ID and when the user ID is assumed to be "0001", the charging target judging section 221 extracts the corresponding callback transmission source telephone number "03-xxxx-xxx1" from the charging management information accumulating section 231. Or, when the attribute data is the telephone number of the transmitting terminal 100 and when the telephone number of the transmitting terminal 100 is assumed to be "090-xxxx-xxx1", the charging target judging section 221 extracts the corresponding callback transmission source telephone number "03-xxxx-xxx1" from the charging management information accumulating section 231. Also, when the attribute data is the HTTP user agent and when the HTTP user agent is assumed to be "Doxxmo/2.0N904i(c100, TJ, ser53432)", the charging target judging section 221 extracts the corresponding transmission number 405 "03-xxxx-xxx1" from the charging management information accumulating section 231. The charging target judging section 221 outputs the extracted callback transmission source telephone number (hereafter, referred to as a selection callback transmission source telephone number), the telephone number of the transmitting terminal 100 included in the callback request, and the telephone number of the receiving terminal 300, to the transmission number determining section 222.

The transmission number determining section 222 will be described below. The transmission number determining section 222 outputs a transmission command to the transmission processing section 223. The transmission number determining section 222 inputs the selection callback transmission source telephone number, the telephone number of the transmitting terminal 100 and the telephone number of the receiving terminal 300, from the charging target judging section 221. The transmission number determining section 222 outputs the transmission command to connect the telephone conversation between the telephone number of the transmitting terminal 100 and the telephone number of the receiving terminal 300, with the selection callback transmission source telephone number as the transmission source, to the transmission processing section 223.

The transmission processing section 223 will be described below. The transmission processing section 223 carries out the transmitting process in accordance with the transmission command from the transmission number determining section 222. The transmission processing section 223 inputs the transmission command of the transmission number determining section 222. The transmission processing section 223 carries out the callback transmission through the first communicating section 210 to the transmitting terminal 100, with the selection callback transmission source telephone number as the transmission source. At the time of the completion of the communication connection to the transmitting terminal 100, the transmission processing section 223 carries out the transmission through the second communicating section 240 to the telephone number of the receiving terminal 300, with the selection callback transmission source telephone number as the transmission source. At the time of the completion of the communication connection to the receiving terminal 300, the transmission processing section 223 connects the communication with the transmitting terminal 100 and the communication with the receiving terminal 300. Thus, between the transmitting terminal 100 and the receiving terminal 300, the telephone conversation connection can be established through the telephone relay server 200.

The above is the description of the configuration in this exemplary embodiment. The storing section 230 in the telephone relay server 200 relates the attribute data of the transmitting terminal 100 and the callback transmission source telephone number to store in the database of the charging management information accumulating section 231. The transmitting terminal 100 transmits the callback request in which the attribute data is included. Thus, the selection callback transmission source telephone number can be determined on the basis of the attribute data of the transmitting terminal 100. The attribute data is grouped, for example, for each department or the like and related to the callback transmission source telephone number. The communication carrier in the communication network 1 charges the usage fee at a callback transmission source telephone number unit. Hence, the company can receive the charging for each group corresponding to the callback transmission source telephone number, namely, for each department of the company.

(Description of Operating Method)

The operating method of the callback system in this exemplary embodiment will be described below by using FIG. 3. FIG. 3 shows the operational flow of the callback system in this exemplary embodiment.

(Step A10)

The user inputs the transmission request to the user interface 110 in the transmitting terminal 100. The transmission request includes the telephone number of the receiving terminal 300. The user interface 110 outputs the transmission request to the transmission request processing section 121 in the processing section 120.

(Step A20)

The transmission request processing section 121 in the processing section 120 inputs the transmission request from the user interface. The transmission request processing section 121 obtains the attribute data from the storing section 130. The transmission request processing section 121 transmits the callback request, which includes the attribute data, the telephone number of the transmitting terminal 100 and the telephone number of the receiving terminal 300, through the communicating section 140 to the telephone relay server 200. The communication network 1 transfers the callback request transmitted by the transmitting terminal 100, to the telephone relay server 200.

(Step A30)

The charging target judging section 221 in the telephone relay server 200 receives the callback request transmitted by the transmitting terminal 100, through the first communicating section 210 from the communication network 1. The charging target judging section 221 obtains the attribute data included in the callback request.

(Step A40)

The charging target judging section 221 extracts the selection callback transmission source telephone number corresponding to the attribute data from the charging management information accumulating section 231 in the storing section 230. The charging target judging section 221 outputs the selection callback transmission source telephone number, the telephone number of the transmitting side telephone terminal 100 and the telephone number of the receiving side telephone terminal 300 to the transmission number determining section 222.

(Step A50)

The transmission number determining section 222 inputs the selection callback transmission source telephone number, the telephone number of the transmitting side telephone terminal 100 and the telephone number of the receiving terminal 300, which are outputted by the charging target judging section 221. The transmission number determining section 222 determines the selection callback transmission source telephone number as the transmission source telephone number. The transmission number determining section 222 outputs the transmission command to the transmission processing section 223 so that the communication between the telephone number of the transmitting terminal 100 and the telephone number of the receiving terminal 300 is connected, with the selection callback transmission source telephone number as the transmission source.

(Step A60)

The transmission processing section 223 inputs the transmission command from the transmission number determining section 222. The transmission processing section 223 carries out the transmission (the callback) addressed to the telephone number of the transmitting terminal 100 through the first communicating section 210, with the selection callback transmission source telephone number as the transmission source. Since the communication connection method between the telephone relay server 200 and the transmitting terminal 100 is based on the conventional technique, its detailed description is omitted.

(Step A70)

At the time of the completion of the communication connection to the transmitting terminal 100, the transmission processing section 223 carries out the transmission addressed to the telephone number of the receiving terminal 300 through the second communicating section 240, with the selection callback transmission source telephone number as the transmission source. Since the communication connection method between the telephone relay server 200 and the receiving terminal 300 is based on the conventional technique, its detailed description is omitted.

(Step A80)

At the time of the completion of the communication connection to the receiving terminal 300, the transmission processing section 223 connects the communication with the transmitting terminal 100 and the communication with the receiving terminal 300.

(Step A90)

When the transmission processing section 223 connects the communication with the transmitting terminal 100 and the communication with the receiving terminal 300, the communication can be carried out between the transmitting terminal 100 and the receiving terminal 300 through the telephone relay server 200.

The above is the description of the operating method of the callback system, in this exemplary embodiment. The transmitting terminal 100 transmits the callback request including the attribute data. The telephone relay server 200 extracts the selection callback transmission source telephone number from the callback transmission source telephone number pre-stored in the database of the charging management information accumulating section 231. The transmission processing section 223 carries out the transmission to the transmitting terminal 100 and the receiving terminal 300, with the selection callback transmission source telephone number as the transmission source. Thus, the selection callback transmission source telephone number can be determined on the basis of the attribute data of the transmitting terminal 100. The communication carrier charges the usage fee for each transmission source telephone number. Hence, for example, since the callback transmission source telephone number is assigned for each department of the company, the usage fee for each department can be easily sorted.

The above is the description of the first exemplary embodiment.

(Second Exemplary Embodiment)

The second exemplary embodiment will be described below. In the first exemplary embodiment, the transmitting terminal 100 transmits the callback request in which the attribute data is included, and the telephone relay server 200 extracts the selection callback transmission source telephone number corresponding to the attribute data from the pre-stored database, and the transmission source telephone number is consequently determined at the time of the callback. In the second exemplary embodiment, the transmitting terminal 100 pre-stores a specification callback transmission source telephone number that is used as the transmission source telephone number at the time of the callback.

(Description of Configuration)

At first, the configuration of the callback system in this exemplary embodiment is described. FIG. 4 is the view showing the configuration of the callback system in this exemplary embodiment. The callback system in this exemplary embodiment contains the communication network 1, the transmitting terminal 100, the telephone relay server 200 and the receiving terminal 300.

At first, the transmitting terminal 100 is described. In this exemplary embodiment, the basic configuration of the transmitting terminal 100 is similar to the first exemplary embodiment. Thus, as for the description of the configuration, the configuration that is different in configuration from the first exemplary embodiment is centrally described. The transmitting terminal 100 contains the user interface 11, the processing section 120, the storing section 130 and the communicating section 140, similarly to the first exemplary embodiment. Also, the processing section 120 contains the transmission request processing section 121, similarly to the first exemplary embodiment. Moreover, the fact that the processing program stored in the storing section 130 can be stored in the portable storing medium 400 is similar to the first exemplary embodiment. In this exemplary embodiment, the structure in which the configuration of the transmitting terminal 100 differs from the first exemplary embodiment lies in the structure in which the storing section 130 in the transmitting terminal 100 further contains a charging target number accumulating section 131. Also, consequently, the process of the transmission request processing section 121 is somewhat different.

The charging target number accumulating section 131 stores the transmission source telephone number at the time of the callback (hereafter, referred to as the specification callback transmission source telephone number). The specification callback transmission source telephone number may be inputted from the user interface 110 by the user, or the transmission request processing section 121 may obtain it by periodically inquiring a managing server for managing the callback transmission source telephone number that is not shown. By the way, this managing server may be the telephone relay server 200 in the first exemplary embodiment. In this case, the processing section 120 in the transmitting terminal 100 may obtain the specification callback transmission source telephone number corresponding to the attribute data, by performing the periodical inquiry, which includes the attribute data, on the telephone relay server 200. Also, the specification callback transmission source telephone number may be stored together with the processing program, when the processing program for attaining the functions of the transmitting terminal 100 is stored in the storing section 130.

Also, in this exemplary embodiment, the transmission request processing section 121 transmits the callback request, which includes the callback transmission source telephone number stored in the charging target number accumulating section 131, the telephone number of the transmitting terminal 100 and the telephone number of the receiving terminal 300.

The above is the difference of the configuration of the transmitting terminal 100 in this exemplary embodiment, and the portions except it is similar to the configuration of the first exemplary embodiment.

The telephone relay server 200 will be described below. In this exemplary embodiment, the basic configuration of the telephone relay server 200 is similar to the first exemplary embodiment. Thus, as for the description of the configuration, the configuration that is different in configuration from the first exemplary embodiment is centrally described. The telephone relay server 200 contains the first communicating section 210, the processing section 220, the storing section 230 and the second communicating section, similarly to the first exemplary embodiment. Also, the processing section 220 contains the transmission processing section 223 and the transmission number determining section 222, similarly to the first exemplary embodiment. Moreover, the fact that the processing program stored in the storing section 230 can be stored in the portable storing medium 400 is similar to the first exemplary embodiment. In this exemplary embodiment, the structure in which the configuration of the telephone relay server 200 differs from the first exemplary embodiment lies in the structure in which the storing section 230 in the telephone relay server 200 does not contain the charging target judging section 221. Also, in the telephone relay server 200, the charging target judging section 221 is not contained in the processing section 220. This is because in both of them, the telephone relay server 200 is not required to determine the selection callback transmission source telephone number.

In this exemplary embodiment, the transmission number determining section 222 receives the callback request transmitted by the transmitting terminal 100, through the first communicating section 210. The transmission number determining section 222 outputs the transmission command to the transmission processing section 223 so that the communication between the telephone number of the transmitting terminal 100 and the telephone number of the receiving terminal 300 is connected, with the specification callback transmission source telephone number included in the callback request as the transmission source.

The above is the difference of the configuration of the telephone relay server 200 in this exemplary embodiment, and the other portions are similar to the configuration of the first exemplary embodiment.

By the way, since the receiving terminal 300 is similar to the first exemplary embodiment, its description is omitted.

The above is the description of the configuration in this exemplary embodiment.

(Description of Operating Method)

The operating method of the callback system in this exemplary embodiment will be described below by using FIG. 5. FIG. 5 shows the operational flow of the callback system in this exemplary embodiment. By the way, in the following description, the specification callback transmission source telephone number is assumed to be stored in advance in the charging target number accumulating section 131 in the storing section 130 in the transmitting terminal 100.

(Step B10)

The user inputs the transmission request to the user interface 110 in the transmitting terminal 100. The transmission request includes the telephone number of the receiving terminal 300. The user interface 110 outputs the transmission request to the transmission request processing section 121 in the processing section 120.

(Step B20)

The transmission request processing section 121 in the processing section 120 inputs the transmission request from the user interface. The transmission request processing section 121 obtains the specification callback transmission source telephone number from the charging target number accumulating section 131 in the storing section 130.

(Step B30)

The transmission request processing section 121 transmits the callback request in which the specification callback transmission source telephone number, the telephone number of the transmitting terminal 100 and the telephone number of the receiving terminal 300 are included, through the communicating section 140 to the telephone relay server 200. The communication network 1 transfers the callback request transmitted by the transmitting terminal 100, to the telephone relay server 200.

(Step B40)

The transmission number determining section 222 in the telephone relay server 200 receives the callback request transmitted by the transmitting terminal 100, through the first communicating section 210 from the communication network 1. The transmission number determining section 222 obtains the specification callback transmission source telephone number, the telephone number of the transmitting terminal 100 and the telephone number of the receiving terminal 300, which are included in the callback request. The transmission number determining section 222 determines the specification callback transmission source telephone number as the transmission source telephone number. The transmission number determining section 222 outputs the transmission command to the transmission processing section 223 so that the communication between the telephone number of the transmitting terminal 100 and the telephone number of the receiving terminal 300 is connected, with the specification callback transmission source telephone number as the transmission source.

(Step B50)

The transmission processing section 223 inputs the transmission command from the transmission number determining section 222. The transmission processing section 223 carries out the transmission (the callback) addressed to the telephone number of the transmitting terminal 100, through the first communicating section 210, with the specification callback transmission source telephone number as the transmission source. Since the communication connection method between the telephone relay server 200 and the transmitting terminal 100 is based on the conventional technique, its detailed description is omitted.

(Step B60)

At the time of the completion of the communication connection to the transmitting terminal 100, the transmission processing section 223 carries out the transmission addressed to the telephone number of the receiving terminal 300, through the second communicating section 240, with the specification callback transmission source telephone number as the transmission source. Since the communication connection method between the telephone relay server 200 and the receiving terminal 300 is based on the conventional technique, its detailed description is omitted.

(Step B70)

At the time of the completion of the communication connection to the receiving terminal 300, the transmission processing section 223 connects the communication with the transmitting terminal 100 and the communication with the receiving terminal 300.

(Step B80)

When the transmission processing section 223 connects the communication with the transmitting terminal 100 and the communication with the receiving terminal 300, between the transmitting terminal 100 and the receiving terminal 300, the communication can be carried out through the telephone relay server 200.

The above is the description of the operating method of the callback system in this exemplary embodiment. Similarly to the first exemplary embodiment, the in-company contact person groups the transmitting terminals 100 by correlating to the department of the company and the like. The in-company contact person determines the specification callback transmission source telephone number by carrying out the correspondence for each group of the transmitting terminals 100. The transmitting terminal 100 stores the predetermined specification callback transmission source telephone number. The transmitting terminal 100 transmits the stored specification callback transmission source telephone number, while it is included in the callback request. The transmission processing section 223 in the telephone relay server 200 carries out the transmission to the transmitting terminal 100 and the receiving terminal 300, with the specification callback transmission source telephone number as the transmission source. The communication carrier charges the usage fee for each telephone number of the transmission source. Thus, the usage fee for each department can be easily sorted.

The above is the description of the second exemplary embodiment.

As described until now, in the first exemplary embodiment, the charging management information accumulating section 231 in the telephone relay server 200 contains the database in which the callback transmission source telephone number is related, for each group of the attribute data of the transmitting terminals 100. The transmitting terminal 100 transmits the callback request in which the attribute data is included. The charging target judging section 221 in the telephone relay server 200 extracts the selection callback transmission source telephone number from the database of the charging management information accumulating section 231, in accordance with the attribute data included in the callback request. The transmission number determining section 222 in the telephone relay server 200 outputs the transmission command so that the communication between the transmitting terminal 100 and the receiving terminal 300 is connected, with the selection callback transmission source telephone number as the transmission source of the callback. The communication carrier in the communication network 1 charges the usage fee at the unit of the transmission source telephone number. The company using the callback system groups the attribute data of the transmitting terminals 100 stored in the charging management information accumulating section 231, for example, correspondingly to the department and the like, and relates each of the groups to the callback transmission source telephone number. With such configuration, as for the callback transmission source telephone number, the telephone number different for each department is selected, which enables the usage fee to be claimed for each department.

Also, in the second exemplary embodiment, the storing section 130 in the transmitting terminal 100 contains the charging target number accumulating section 131 that stores the specification callback transmission source telephone number. The transmitting terminal 100 transmits the callback request in which the specification callback transmission source telephone number is included. The transmission number determining section 222 in the telephone relay server 200 outputs the transmission command so that the communication between the transmitting terminal 100 and the receiving terminal 300 is connected, with the specification callback transmission source number included in the callback request as the transmission source at the time of the callback. The communication carrier in the communication network 1 claims the usage fee at the unit of the transmission source telephone number. The in-company contact person groups the transmitting terminals 100, for example, correspondingly to the department, and carries out the determination while each of the groups is related to the specification callback transmission source telephone number. The transmitting terminal 100 stores the predetermined specification callback transmission source telephone number in the charging target number accumulating section 131. With such configuration, as for the transmission source telephone number at the time of the callback, the telephone number different for each department is selected, which enables the usage fee to be claimed for each department.

By the way, the first exemplary embodiment and the second exemplary embodiment are not necessarily attained only in respective independency. The first exemplary embodiment and the second exemplary embodiment can be also attained by combining the necessary configurations thereof. For example, as described in the second exemplary embodiment, the transmitting terminal 100 may obtain the specification callback transmission source telephone number from the telephone relay server 200. In this case, similarly to the first exemplary embodiment, the storing section 230 in the telephone relay server 200 contains the charging management information accumulating section 231. Then, similarly to the first exemplary embodiment, the transmission request processing section 121 in the transmitting terminal 100 transmits the request in which the attribute data of the transmitting terminal 100 is included, to the telephone relay server 200. By the way, the request in this case becomes the obtainment request to obtain the specification callback transmission source telephone number. The telephone relay server 200 receives the request from the transmitting terminal 100, extracts the callback transmission source telephone number corresponding to the attribute data of the transmitting terminal 100 from the charging management information accumulating section 231, and responds to the transmitting terminal 100. After that, the transmitting terminal 100 uses the specification callback transmission source telephone number obtained from the telephone relay server 200 and transmits the callback request. In this way, it is also possible to attain the callback system, by combining the configuration of the first exemplary embodiment with the second exemplary embodiment.

As mentioned above, the present invention has been described by referring to the exemplary embodiments. However, the present invention is not limited to the above-mentioned exemplary embodiments. The various modifications that can be understood by one skilled in the art can be made to the configurations and details of the present invention, within the scope of the present invention.

The invention claimed is:

1. A callback system comprising:
    a transmitting terminal configured to transmit a callback request which is used to start a callback communication between said transmitting terminal and a receiving terminal,
    wherein said callback request includes a charging target data used to determine a charging target which a usage fee of said callback communication is charged to;
    a telephone relay server configured to connect said callback communication by connecting a first communication with said transmitting terminal in one hand, connecting a second communication with said receiving terminal in the other hand and connecting said first and second communications; and
    a storing section configured to store a telephone number of said charging target used by said telephone relay server to charge said usage fee.

2. The callback system according to claim 1,
    wherein said transmitting terminal comprises:
    another storing section configured to store a telephone number of said transmitting terminal and an attribute data which is uniquely given to said transmitting terminal and used as said charging target data; and
    a user interface configured to input a telephone number of said receiving terminal,
    wherein said storing section is included in said telephone relay server and stores a database configured to include an attribute group generated by collecting a plurality of said attribute data and said telephone number of the charging target related to said attribute group, and
    wherein said telephone relay server charges said usage fee of the callback communication to said charging target by using said telephone number of the charging target.

3. The callback system according to claim 2,
    wherein said telephone relay server extracts from said database said telephone number of the charging target related to said attribute group in response to said attribute data included in said callback request,
    wherein said attribute data is a user ID uniquely given to said transmitting terminal, a telephone number of said transmitting terminal or an HTTP (HyperText Transfer Protocol) user agent of said transmitting terminal.

4. The callback system according to claim 1,
    wherein said transmitting terminal comprises:
    said storing section which further stores a telephone number of said transmitting terminal and comprises a charging target number accumulating section configured to store said telephone number of the charging target which is used as said charging target; and
    a user interface configured to input a telephone number of said receiving terminal,
    wherein said callback request further includes said telephone number of the transmitting terminal and said telephone number of the receiving terminal, and
    wherein said telephone relay server charges said usage fee of the callback communication to said charging target by using said telephone number of the charging target.

5. The callback system according to claim 2,
    wherein said telephone relay server extracts from said database said telephone number of the charging target related to said attribute group in response to said attribute data included in said callback request,
    wherein said transmitting terminal generates another callback request including said extracted telephone number of the charging target, said telephone number of the transmitting terminal and said telephone number of the receiving terminal, and
    wherein said telephone relay server charges said usage fee of the callback communication to said charging target by using said telephone number of the charging target.

6. A callback method comprising:
    storing a telephone number of a charging target, wherein a usage fee of a callback communication between a transmitting terminal and a receiving terminal is charged to said charging target;
transmitting to a telephone server a callback request used to start said callback communication,
wherein said callback request includes a charging target data;
connecting said callback communication,
wherein said connecting comprises:
connecting a first communication between said telephone server and said transmitting terminal in one hand;
connecting a second communication between said telephone server and said receiving terminal in the other hand; and
connecting said first and second communications;
determining said charging target with said charging target data; and
charging said usage fee to said charging target.

7. The callback method according to claim 6, further comprising:
storing in said transmitting terminal a telephone number of said transmitting terminal and an attribute data,
wherein said attribute data is uniquely given to said transmitting terminal and used as said charging target data;
inputting a telephone number of said receiving terminal in said transmitting terminal; and
storing in said telephone relay server a database configured to include an attribute group and said telephone number of the charging target related to said attribute group,
wherein said attribute group is generate by collecting a plurality of said attribute data;
wherein said charging comprises:
using said telephone number of the charging target.

8. The callback method according to claim 7,
further comprising:
extracting from said database said telephone number of the charging target related to said attribute group in response to said attribute data included in said callback request.

9. The callback method according to claim 6,
further comprising:
storing a telephone number of said transmitting terminal and said telephone number of the charging target in said transmitting terminal,
wherein said telephone number of the charging target is used as said charging target;
inputting a telephone number of said receiving terminal to said transmitting terminal;
generating said callback request further including said telephone number of the transmitting terminal and said telephone number of the receiving terminal;
charging said usage fee of the callback communication to said charging target by using said telephone number of the charging target.

10. The callback method according to claim 7, further comprising:
extracting in said telephone relay server from said database said telephone number of the charging target related to said attribute group in response to said attribute data included in said callback request;
generating in said transmitting terminal another callback request including said extracted telephone number of the charging target, said telephone number of the transmitting terminal and said telephone number of the receiving terminal;
charging said usage fee of the callback communication to said charging target by using said telephone number of the charging target.

11. A computer-readable non-transitory recording medium storing computer instructions for causing a computer executing the instructions to perform an operation of a callback method, wherein the callback method comprises:
storing a telephone number of a charging target,
wherein a usage fee of a callback communication between a transmitting terminal and a receiving terminal is charged to said charging target;
transmitting to a telephone server a callback request used to start said callback communication,
wherein said callback request includes a charging target data;
connecting said callback communication,
wherein said connecting comprises:
connecting a first communication between said telephone server and said transmitting terminal in one hand;
connecting a second communication between said telephone server and said receiving terminal in the other hand; and
connecting said first and second communications;
determining said charging target with said charging target data; and
charging said usage fee to said charging target.

12. The computer-readable non-transitory recording medium according to claim 11, further comprising:
storing in said transmitting terminal a telephone number of said transmitting terminal and an attribute data,
wherein said attribute data is uniquely given to said transmitting terminal and used as said charging target data;
inputting a telephone number of said receiving terminal in said transmitting terminal; and
storing in said telephone relay server a database configured to include an attribute group and said telephone number of the charging target related to said attribute group,
wherein said attribute group is generate by collecting a plurality of said attribute data;
wherein said charging comprises:
using said telephone number of the charging target.

13. The computer-readable non-transitory recording medium according to claim 12,
further comprising:
extracting from said database said telephone number of the charging target related to said attribute group in response to said attribute data included in said callback request.

14. The computer-readable non-transitory recording medium according to claim 11,
further comprising:
storing a telephone number of said transmitting terminal and said telephone number of the charging target in said transmitting terminal,
wherein said telephone number of the charging target is used as said charging target;
inputting a telephone number of said receiving terminal to said transmitting terminal;
generating said callback request further including said telephone number of the transmitting terminal and said telephone number of the receiving terminal;
charging said usage fee of the callback communication to said charging target by using said telephone number of the charging target.

15. The computer-readable non-transitory recording medium according to claim 12, further comprising:
extracting in said telephone relay server from said database said telephone number of the charging target related to said attribute group in response to said attribute data included in said callback request;

generating in said transmitting terminal another callback request including said extracted telephone number of the charging target, said telephone number of the transmitting terminal and said telephone number of the receiving terminal;

charging said usage fee of the callback communication to said charging target by using said telephone number of the charging target.

\* \* \* \* \*